(12) United States Patent
Shu

(10) Patent No.: US 9,915,079 B2
(45) Date of Patent: Mar. 13, 2018

(54) VARIABLE-RIGIDITY SEISMIC-ISOLATION LAYER RIGIDITY CONTROL MECHANISM SUITABLE FOR STRUCTURAL SEISMIC ISOLATION AND WIND RESISTANCE

(71) Applicant: Architectural Design & Research Institute Of South China University of Technology, Guanzhou, Guangdong Province (CN)

(72) Inventor: Xuanwu Shu, Guangzhou (CN)

(73) Assignee: ARCHITECTURAL DESIGN & RESEARCH INSTITUTE OF SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 15/306,412

(22) PCT Filed: Aug. 12, 2014

(86) PCT No.: PCT/CN2014/084192
§ 371 (c)(1),
(2) Date: Oct. 24, 2016

(87) PCT Pub. No.: WO2015/161586
PCT Pub. Date: Oct. 29, 2015

(65) Prior Publication Data
US 2017/0044789 A1     Feb. 16, 2017

(30) Foreign Application Priority Data

Apr. 23, 2014   (CN) .......................... 2014 1 0166035

(51) Int. Cl.
E04H 9/02      (2006.01)
E04H 9/14      (2006.01)
(Continued)

(52) U.S. Cl.
CPC ............. *E04H 9/023* (2013.01); *E02D 27/34* (2013.01); *E04B 1/985* (2013.01); *E04H 9/02* (2013.01); *E04H 9/14* (2013.01)

(58) Field of Classification Search
CPC .. E04H 9/023; E04H 9/14; E04H 9/02; E04B 1/985; E04B 1/98; E02D 27/34
See application file for complete search history.

(56) References Cited

U.S. PATENT DOCUMENTS 4,117,637 A * 10/1978 Robinson .................. E04B 1/98
52/167.1
4,499,694 A * 2/1985 Buckle ...................... E04B 1/98
52/167.7

(Continued)

*Primary Examiner* — Rodney Mintz
(74) *Attorney, Agent, or Firm* — Hoffmann & Baron, LLP

(57) ABSTRACT

The present invention discloses a stiffness control mechanism of a variable stiffness earthquake-isolation layer adapted to structural earthquake isolation and wind resistance, which comprises an upper flange plate connected to an upper structure, a lower flange plate connected to a base structure at the bottom, a pin key provided between hollow portions of the upper and lower flange plates, with the pin key movable up and down between the hollow portions of the upper and lower flange plates and the height of the pin key greater than the distance between the upper and lower flange plates, and a control means for fixing the pin key or controlling the pin key to move downward. The stiffness control mechanism of the earthquake-isolation layer of the present invention can automatically change stiffness of the earthquake-isolation layer, both effectively wind resistant and effectively earthquake resistant.

7 Claims, 10 Drawing Sheets

(51) Int. Cl.
  *E04B 1/98* (2006.01)
  *E02D 27/34* (2006.01)

(56) References Cited

U.S. PATENT DOCUMENTS

| | | | | |
|---|---|---|---|---|
| 4,593,502 | A * | 6/1986 | Buckle | E04B 1/98 52/167.7 |
| 4,713,917 | A * | 12/1987 | Buckle | E01D 19/041 248/565 |
| 5,182,888 | A * | 2/1993 | Miyamoto | E04H 9/022 52/167.2 |
| 5,201,155 | A * | 4/1993 | Shimoda | E01D 19/041 248/634 |
| 5,597,240 | A * | 1/1997 | Fyfe | E01D 19/041 14/73.5 |
| 5,655,756 | A * | 8/1997 | Robinson | E04H 9/022 267/140.2 |
| 5,765,322 | A * | 6/1998 | Kubo | E04H 9/022 248/634 |
| 5,806,250 | A * | 9/1998 | Medeot | E04H 9/021 52/167.1 |
| 6,385,918 | B1 * | 5/2002 | Robinson | F16F 1/40 267/140.2 |
| 6,749,359 | B1 * | 6/2004 | Kirschner | E04H 9/02 403/338 |
| 7,337,586 | B2 * | 3/2008 | Lin | E01D 19/00 52/167.1 |
| 8,833,745 | B2 * | 9/2014 | Fujita | E04H 9/023 248/566 |
| 2004/0146343 | A1 * | 7/2004 | Kirschner | E04H 9/02 403/338 |
| 2006/0233604 | A1 * | 10/2006 | Kirschner | E04H 9/02 403/338 |
| 2011/0227265 | A1 * | 9/2011 | Fujita | E04H 9/023 267/140.13 |
| 2012/0175489 | A1 * | 7/2012 | Taylor | F16F 15/067 248/563 |
| 2014/0117599 | A1 * | 5/2014 | Poyatos | E04H 9/021 267/136 |
| 2014/0245670 | A1 * | 9/2014 | Cho | E04H 9/022 52/167.4 |
| 2015/0159370 | A1 * | 6/2015 | Ruan | E02D 27/42 52/167.4 |
| 2015/0191906 | A1 * | 7/2015 | Kochiyama | E01D 19/041 52/167.7 |
| 2016/0122498 | A1 * | 5/2016 | Wake | C08K 3/04 52/167.1 |
| 2017/0044763 | A1 * | 2/2017 | Shu | E04B 1/985 |
| 2018/0002923 | A1 * | 1/2018 | Swallow | E04B 1/98 |

* cited by examiner

VARIABLE-RIGIDITY SEISMIC-ISOLATION LAYER RIGIDITY CONTROL MECHANISM SUITABLE FOR STRUCTURAL SEISMIC ISOLATION AND WIND RESISTANCE

FIELD OF THE INVENTION

The present invention relates to the field of structural earthquake-and-wind resistance, especially a stiffness control mechanism of a variable stiffness earthquake-isolation layer adapted to structural earthquake isolation and wind resistance.

BACKGROUND OF THE INVENTION

There are two ways to resist earthquakes: One is resisting, that is increasing the strength of a structure so as to ensure the safety of the structure when the structure is under the action of an earthquake with the expected intensity (FIGS. 1 and 3); the other is relieving, that is providing an earthquake-isolation layer with very small horizontal stiffness between the main structure and the basic structure, so that the main structure is basically isolated from the earth in the horizontal direction and the earthquake energy is not easy to spread to the main structure, thus avoiding damage of the main structure (as shown in FIGS. 2 and 4, in which the earthquake-isolation layer 26 is disposed between the main structure 27 and the base structure 28). For the main structure, the smaller the horizontal stiffness of the earthquake-isolation layer, the weaker the response of the upper structure to an earthquake will be. That is, for the action on an earthquake, the smaller the horizontal stiffness of the earthquake-isolation layer, the more advantageous it will be to the upper structure (FIG. 4). In FIGS. 3 and 4, the ground moves back and forth horizontally when an earthquake occurs.

On the other hand, the structure is resistant to a wind load. And the probability of the structure encountering strong winds is much higher than encountering strong earthquakes. For structural wind resistance, providing an earthquake-isolation layer is disadvantageous, and the smaller the horizontal stiffness of the earthquake-isolation layer, the more disadvantageous it will be to the upper structure (FIGS. 5 and 6). Therefore, an earthquake-isolation structure of a common earthquake-isolation layer is adopted, with the horizontal stiffness of the earthquake-isolation layer being a trade-off between the structural earthquake isolation and wind resistance.

Contents of the Invention

A purpose of the present invention is to provide a stiffness control mechanism of a variable stiffness earthquake-isolation layer adapted to structural earthquake isolation and wind resistance, so as to overcome the shortcomings and deficiencies of the prior art.

The purpose of the present invention is achieved through the following technical solution:

A stiffness control mechanism of a variable stiffness earthquake-isolation layer adapted to structural earthquake isolation and wind resistance is provided, comprising an upper flange plate connected to an upper structure, a lower flange plate connected to a base structure at the bottom, a pin key provided between hollow portions of the upper and lower flange plates, with the pin key movable up and down between the hollow portions of the upper and lower flange plates and the height of the pin key greater than the distance between the upper and lower flange plates, and a control means for fixing the pin key or controlling the pin key to move downward. Stiffness of the stiffness control mechanism is connected in parallel with stiffness of the earthquake-isolation support.

The control means comprises an elastic holder provided in an interval between the upper and lower flange plates and used for gripping the pin key, a movable lug locking both ends of the elastic holder, a bearing rod fixed to the lower flange plate, a steel ball placed on the bearing rod, and a flexible cord connecting the steel ball and the movable lug, wherein the length of the flexible cord is greater than the vertical distance of the movable lug from the steel ball, and less than the sum of the vertical distance of the movable lug from the steel ball and the height of the bearing rod, and the elastic holder is fixedly connected with the lower flange plate. Wherein the steel ball can also be other objects with greater mass and have other shapes; the reason for choosing the steel ball is because steel has greater density and has smaller volume in the case of the same mass, and thus will be more stable when placed on the bearing rod, and steel is relatively common and less expensive; the spherical shape is selected because a spheroid is more sensitive to horizontal disturbance, and can roll down from the bearing rod in the event of an earthquake to complete the default action; after the movable lug locks the elastic holder, the elastic holder grips the pin key to form effective support for the pin key; here the pin key is located in the hollow portion between the upper and lower flange plates, the relative horizontal displacement between the upper and lower flange plates is limited, and the horizontal stiffness between them is very large, which is advantageous to resistance to strong winds and applicable to the state in which there is no earthquake; when an earthquake occurs, since the bearing rod only provides vertical support to the steel ball, the steel ball will become unstable to fall down from the bearing rod under the action of the earthquake, which drives the movable lug to fall off from both ends of the elastic holder; the elastic holder loses its grip on the pin key, which then loses support and falls down to the lower flange plate; here the pin key is not in the hollow portion of the upper flange plate, the relative horizontal displacement between the upper and lower flange plates is no longer limited, and the horizontal stiffness between them becomes less, which is advantageous to earthquake resistance, because the earthquake energy is not easy to spread to the main structure and then damage of the main structure is avoided.

The bearing rod is provided at the top with a shallow groove adapted to the size of the steel ball. The steel ball, disposed in the shallow groove, can effectively avoid miscarriage of justice caused by the slight horizontal non-earthquake disturbance; and the groove is shallow, which will not prevent the steel ball from rolling down from the bearing rod when an earthquake really occurs to complete the default action.

The elastic holder, in the form of a symmetrical curve, can fix the pin key between the upper and lower flange plates when it is locked by the movable lug; it can open automatically when the movable lug is detached from it, thus losing the function of fixing the pin key. The elastic holder is set to be in the form of a symmetrical curve, so as to achieve better effects of gripping the pin key, and facilitate release of the pin key when the movable lug is detached from the elastic holder.

The control means comprises K lateral apertures in the lower flange plate, K stop sliders in the K apertures, a stop ring provided on the inner side with a strip groove that is arranged at the exit of the K lateral apertures on the outer side of the lower flange plate, M electromagnets connected to the bottom of the stop ring, an electromagnet coil wrapped around the lower portion of the electromagnet, a circuit connected to the electromagnet coil, and a ball placed on a normally open switch of the circuit, wherein K≥2 and M≥K. Wherein the stop slider in a stop aperture is not moveable outward under restraint of the stop ring, thereby forming effective support for the pin key to make the pin key located in the hollow portion between the upper and lower flange plates; meanwhile the gravity of the pin key makes the stop slider have the trend and force of moving outward, which force prevents the stop ring with a strip groove from sliding down, and here the relative displacement between the upper and lower flange plates is limited, with the horizontal stiffness between them very large to be advantageous to wind resistance; when an earthquake occurs, vibration and swing of the ground makes the steel ball disposed on the normally open switch roll down, which makes the normally open switch switched on, the circuit begin to work and the electromagnet coil energized; the electromagnet iron core is subjected to a downward electromagnetic force and, under the combined action of the gravity of the electromagnet iron core and the electromagnetic force, is moved downward with the stop ring connected thereto; after the stop ring is pulled down, the stop slider loses the restraint of the stop ring and slides out under the action of the gravity of the pin key, and then the pin key loses support of the stop slider and falls into the hollow portion of the lower flange plate; here the pin key is not in the hollow portion of the upper flange plate, the relative horizontal displacement between the upper and lower flange plates is no longer limited, and the horizontal stiffness between them becomes less, which is advantageous to earthquake resistance, because the earthquake energy is not easy to spread to the main structure and then damage of the main structure is avoided.

The circuit is also connected in series with a normally closed switch that is located just under the pin key. After the pin key drops, the normally closed switch is switched off under the action of the gravity of the pin key, and the electromagnet coil is powered off to stop working, thus avoiding the waste of energy.

The control means comprises an inner hole disposed in the middle of the pin key, a pin-key supporting means internally threaded and passing through the inner hole, a screw adapted to the thread on the inner side, a stepping motor connected to the screw, a computer controlling the stepping motor to work, and an acceleration sensor connected to the computer, as well as a means for restricting free rotation of the pin key relative to the lower flange plate and a means for restricting free rotation of the pin-key supporting means in the inner hole. Under normal circumstances, the screw is screwed into an aperture threaded inside and provided in the longitudinal direction of the pin key; here the pin key is located in the hollow portion between the upper and lower flange plates, the relative displacement between the upper and lower flange plates is limited, and the horizontal stiffness between them is very large, which is advantageous to wind resistance; when an earthquake occurs, the ground vibration information is captured by an acceleration sensor and transferred to a computer; when the acceleration value reaches a certain value, the computer issues commands, and the stepping motor begins to work and drives the screw to retract until the screw is completely detached from the pin key, which makes the pin key lose support and fall down into the hollow portion of the lower flange plate; here the pin key is not in the hollow portion of the upper flange plate, the relative horizontal displacement between the upper and lower flange plates is no longer limited, and the horizontal stiffness between them becomes less, which is advantageous to earthquake resistance, because the earthquake energy is not easy to spread to the main structure, and thus damage of the main structure is avoided.

The stepping motor is disposed just under the screw, and the pin key is provided at the lower portion with a groove adapted to the size of the stepping motor.

The present invention has the following advantages and beneficial effects compared with the prior art:

A. For the effect of isolating earthquakes, the smaller the horizontal stiffness of the earthquake-isolation layer, the better the earthquake-isolation effects of the layer will be. However, it is unfavorable to provide an earthquake-isolation layer for wind resistance. Therefore, in terms of wind resistance, the greater the horizontal stiffness of the earthquake-isolation support, the better. For the earthquake-isolation layer of the traditional earthquake-isolation structure, both the earthquake-isolation effects and the wind resistance effects have to be taken into account, and therefore the structure should have horizontal stiffness that can be neither too big nor too small. In this way, the structural performance of the traditional earthquake-isolation structure is better than that of the common structure in an earthquake, but is poorer than that of the common structure under the action of a wind load. For the variable stiffness earthquake-isolation layer of the present invention under the action of a wind load, the earthquake-isolation support cannot provide the earthquake-isolation effects, having the structural performance identical to the common structure; in a horizontal earthquake, the earthquake-isolation support can provide the earthquake-isolation effects, having the structural performance identical to the earthquake-isolation structure. Besides, since the earthquake-isolation layer does not work under the action of a wind load, the horizontal stiffness of the earthquake-isolation support is designed to be as small as possible, so as to reduce the response of the structure to an earthquake as far as possible. In this way, the variable stiffness earthquake-isolation layer of the present invention can both insolate action of a horizontal earthquake under the action of the earthquake as far as possible, and ensure not to affect the performance of the structure to withstand a wind load.

B. In the traditional structure, the response of the structure under a wind load is reduced by increasing the damping of the earthquake-isolation support, so as to make up for the negative impact of the earthquake-isolation support on the structure. However, the damping of the earthquake-isolation support will affect the earthquake-isolation effects, the greater the damping, then the poorer the earthquake-isolation effects. Increasing the damping of the earthquake-isolation support not only increases the cost of the earthquake-isolation support, but also affects the earthquake-isolation effects. The variable stiffness earthquake-isolation support of the present invention is equivalent to the common structure under the action of a wind load, not necessary to improve the wind resistance of the structure by specially increasing the damping thereof.

C. In order to make the earthquake-isolation support have a certain damping, the traditional earthquake-isolation layer generally uses a rubber support. The support has a larger size because the strength of rubber is not high. There is also an aging problem with rubber, and therefore maintenance and replacement of the support must be considered. The variable stiffness earthquake-isolation support of the present invention does not need the earthquake-isolation layer to provide damping, and can be a traditional rubber earthquake-isolation support or an earthquake-isolation support made of high-strength metal materials and resulting in displacement by mechanical movement. Because the strength of the metal material is high, the size of the support relative to the rubber support can be much smaller. The earthquake-isolation support made of stainless steel, weathering steel, surface galvanized high-strength steel and other metal materials can maintain long-term constant performance, and therefore maintenance and replacement of the support can be generally not considered.

Figure 1:
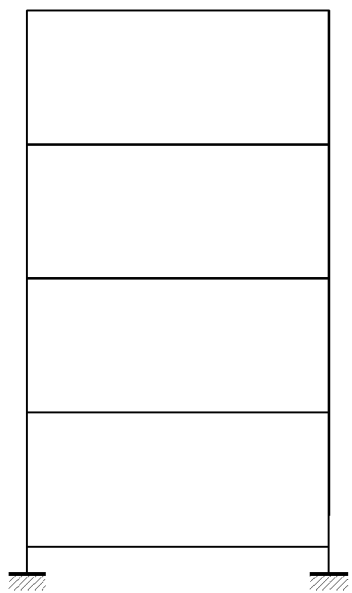
FIG. 1 is a structural schematic drawing of a general wall in the prior art.
Figure 2:
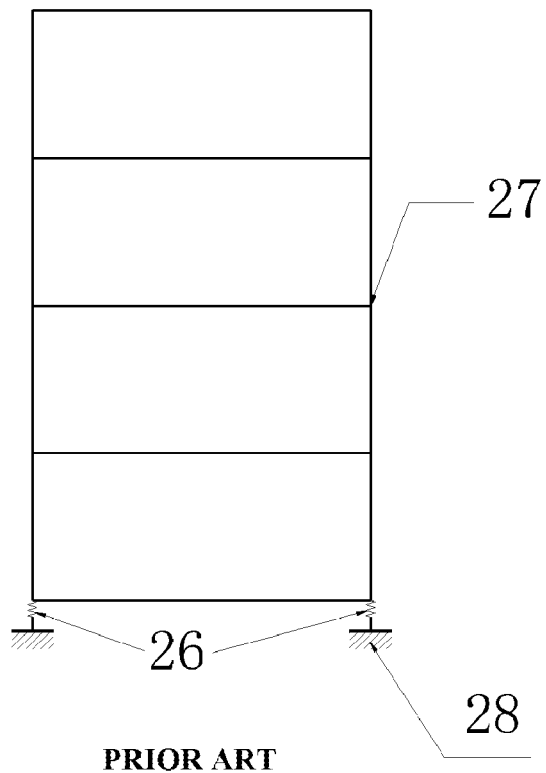
FIG. 2 is a structural schematic drawing of a wall provided with an earthquake-isolation means in the prior art.
Figure 3:
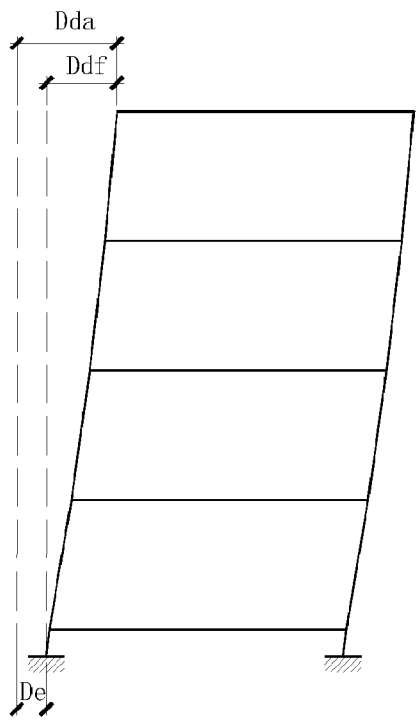
FIG. 3 is a schematic drawing of deformation of the wall in FIG. 1 under the action of an earthquake.
Figure 4:
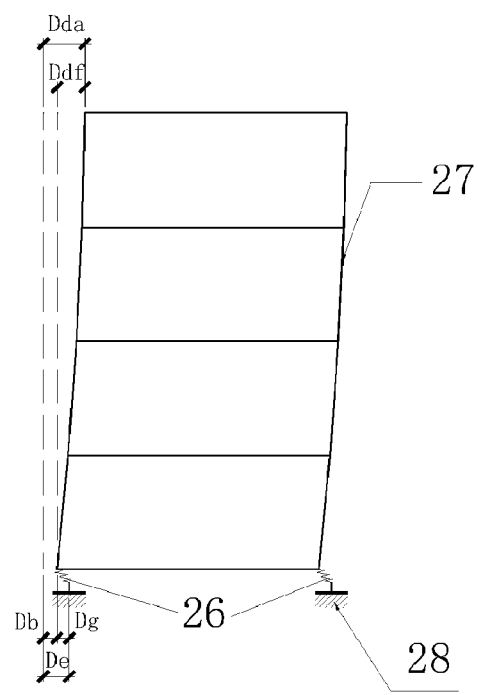
FIG. 4 is a schematic drawing of deformation of the wall in FIG. 2 under the action of an earthquake.
Figure 5:
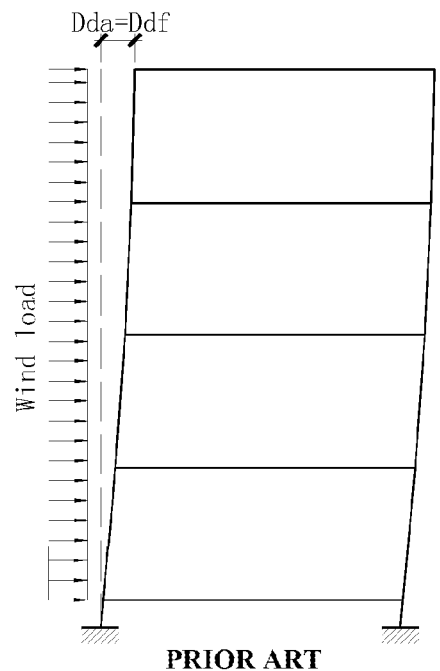
FIG. 5 is a schematic drawing of deformation of the wall in FIG. 1 under the action of a wind load.
Figure 6:
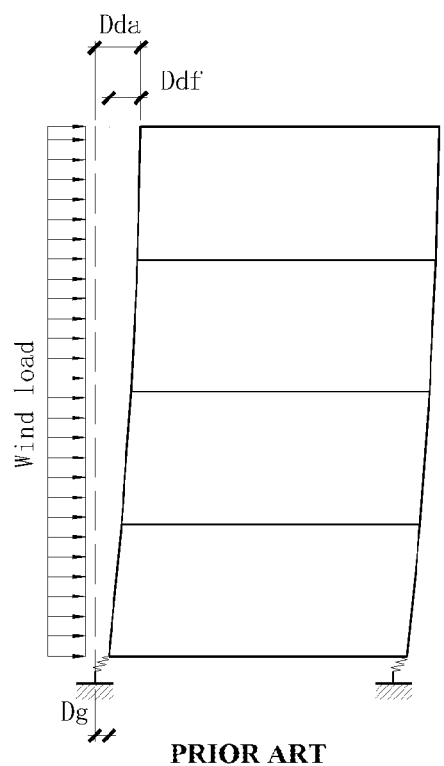
FIG. 6 is a schematic drawing of deformation of the wall in FIG. 2 under the action of a wind load.

Wherein in FIGS. 3-9, De stands for displacement of the ground, Db stands for the absolute displacement of the bottom of the structure, Dg stands for displacement of the earthquake-isolation support, Dda stands for the absolute displacement of the top of the structure, and Ddf stands for the relative displacement of the top of the structure.

DETAILED DESCRIPTION OF THE EMBODIMENTS

The present invention will be further described in detail below with reference to examples and drawings, however the embodiments of the present invention are not limited thereto.

Example 1

As shown in FIGS. 7-13, a stiffness control mechanism of a variable stiffness earthquake-isolation layer adapted to structural earthquake isolation and wind resistance is provided, comprising an upper flange plate 1 connected to an upper structure, a lower flange plate 2 connected to a base structure at the bottom, a pin key 3 provided between hollow portions of the upper flange plate 1 and the lower flange plate 2, with the pin key 3 movable up and down between the hollow portions of the upper flange plate 1 and the lower flange plate 2 and the height of the pin key greater than the distance between the upper flange plate 1 and the lower flange plate 2, and a control means for fixing the pin key 3 or controlling the pin key 3 to move downward;

wherein the control means comprises an elastic holder 4 provided in an interval between the upper flange plate 1 and the lower flange plate 2 and used for gripping the pin key, a movable lug 5 locking both ends of the elastic holder 4, a bearing rod 6 fixed to the lower flange plate 2, a steel ball 7 placed on the bearing rod 6, and a flexible cord 8 connecting the steel ball 7 and the movable lug 5, wherein the length of the flexible cord 8 is greater than the vertical distance of the movable lug 5 from the steel ball 7, and less than the sum of the vertical distance of the movable lug 5 from the steel ball 7 and the height of the bearing rod 6, with the elastic holder 4 fixedly connected with the upper flange plate 1 or the lower flange plate 2;

the bearing rod 6 is provided at the top with a shallow groove adapted to the size of the steel ball; and the elastic holder 4 is in the form of a symmetrical curve.

Figure 7:
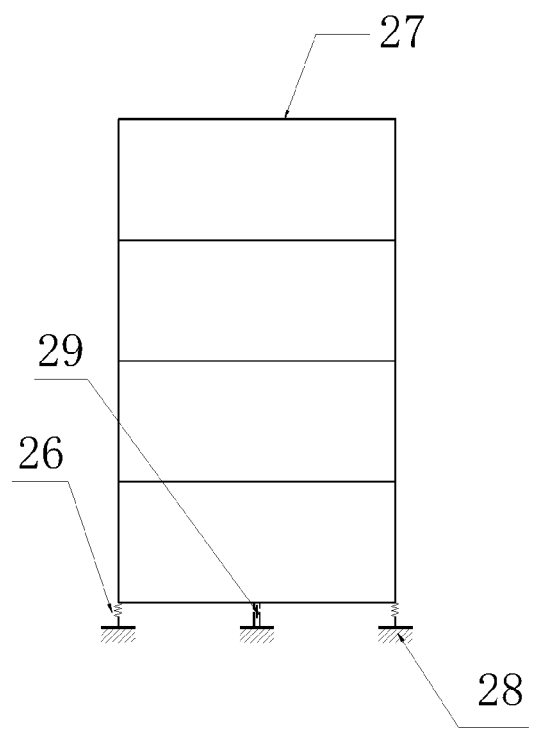
FIG. 7 is a structural schematic drawing of the stiffness control mechanism of the variable stiffness earthquake-isolation layer adapted to structural earthquake isolation and wind resistance of the present invention.

The earthquake-isolation layer 26 and the stiffness control mechanism 29 in FIG. 7 are both disposed between the main structure 27 and the base structure 28.

Figure 8:
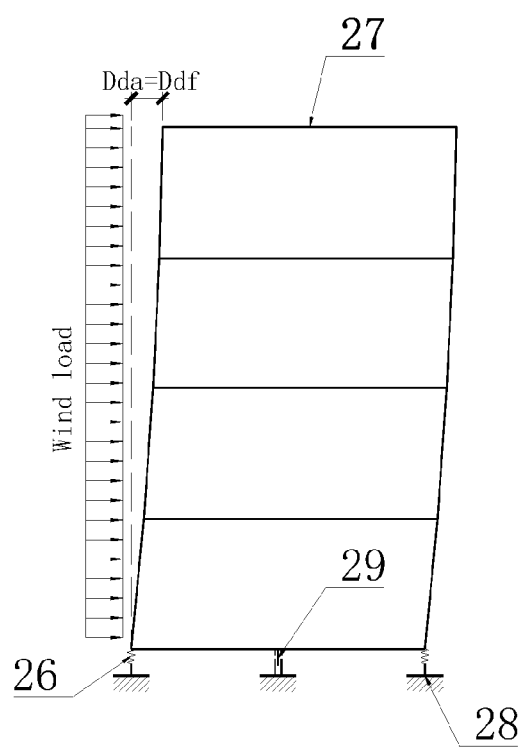
FIG. 8 is a schematic drawing of deformation of the stiffness control mechanism in FIG. 7 under the action of a wind load.
Figure 9:
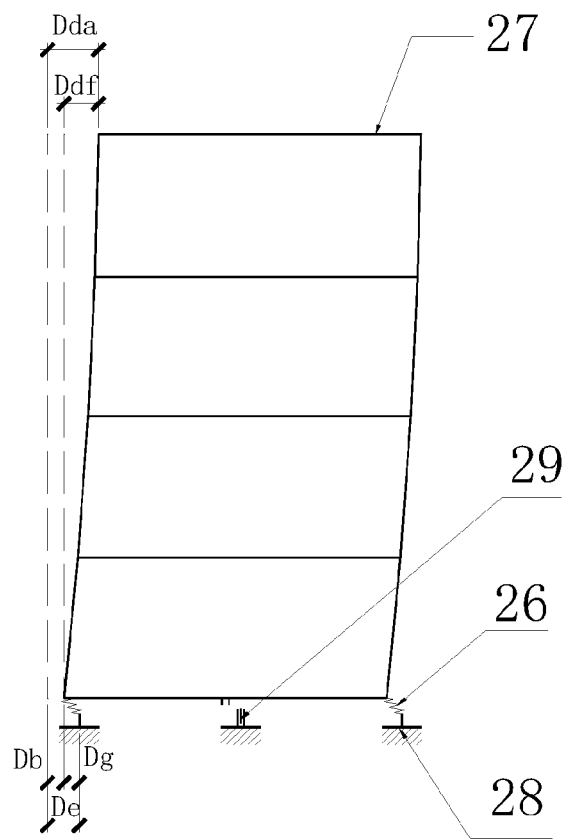
FIG. 9 is a schematic drawing of deformation of the stiffness control mechanism in FIG. 7 under the action of an earthquake.
Figure 10:
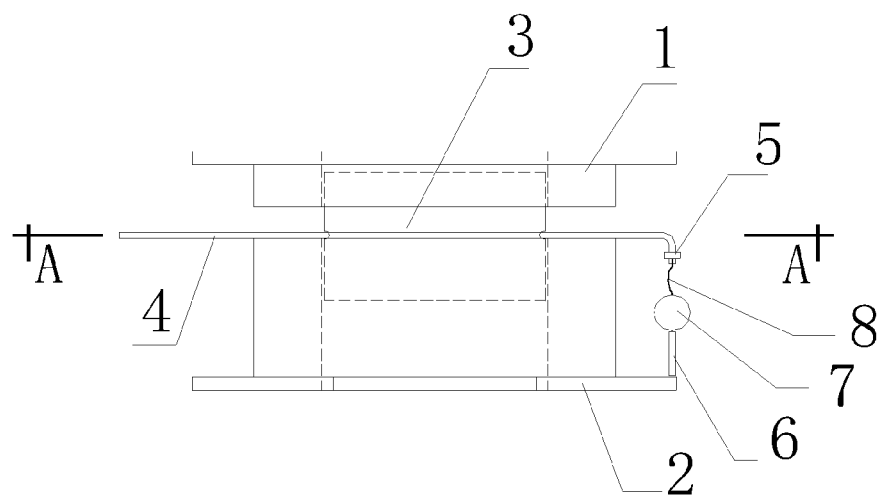
FIG. 10 is a schematic drawing of the stiffness control mechanism of the variable stiffness earthquake-isolation layer adapted to structural earthquake isolation and wind resistance of the present invention when the pin key is in the working state.
Figure 11:
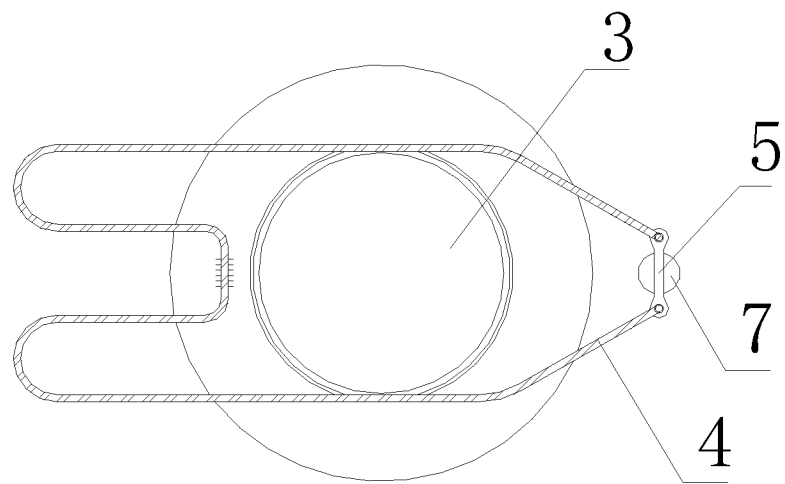
FIG. 11 is a schematic drawing of the A-A face of the stiffness control mechanism in FIG. 10.
Figure 12:
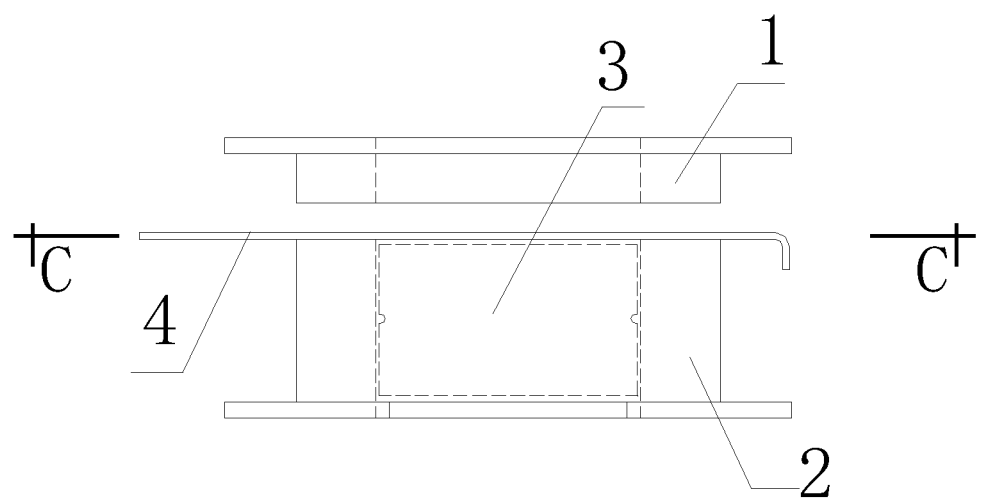
FIG. 12 is a schematic drawing of the stiffness control mechanism in FIG. 10 when the pin key is in the non-working state.
Figure 13:
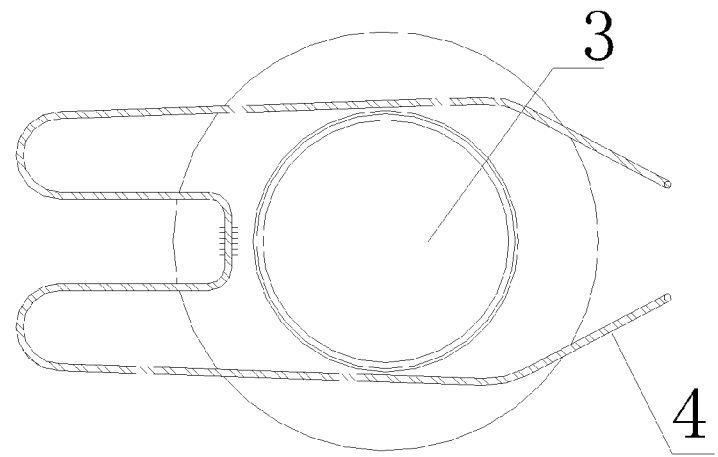
FIG. 13 is a schematic drawing of the C-C face of the stiffness control mechanism in FIG. 12.
Figure 14:
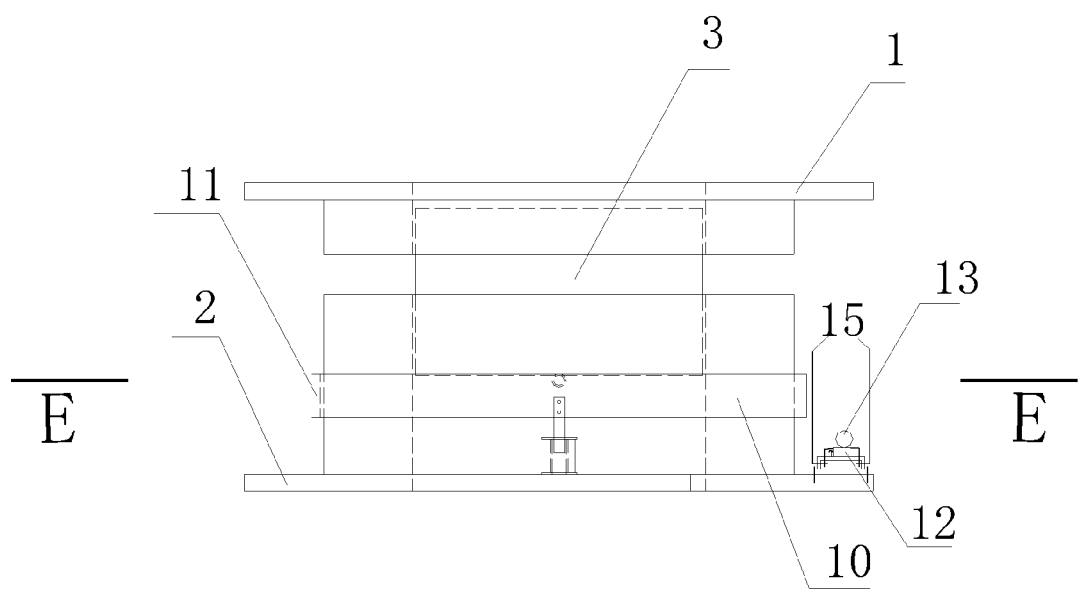
FIG. 14 is a schematic drawing of the stiffness control mechanism of the variable stiffness earthquake-isolation layer adapted to structural earthquake isolation and wind resistance of the present invention when the pin key is in the working state.
Figure 15:
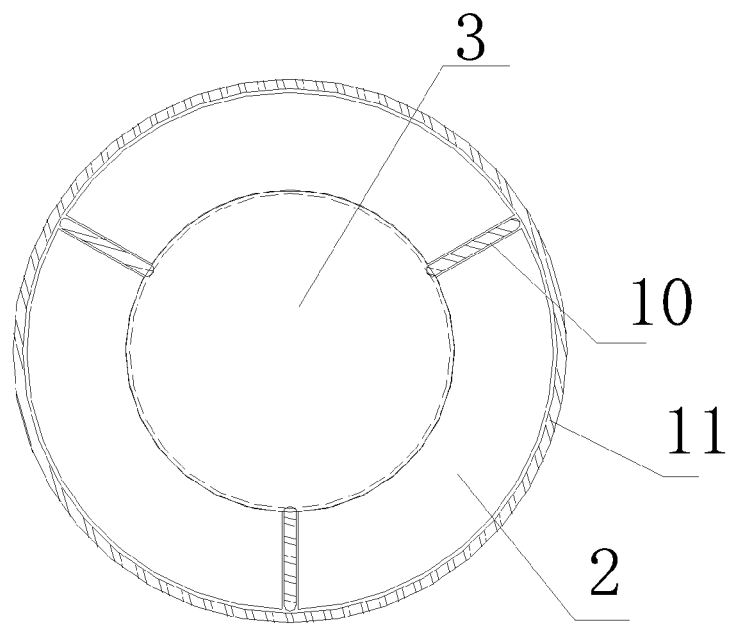
FIG. 15 is a schematic drawing of the E-E face of the stiffness control mechanism in FIG. 14.
Figure 16:
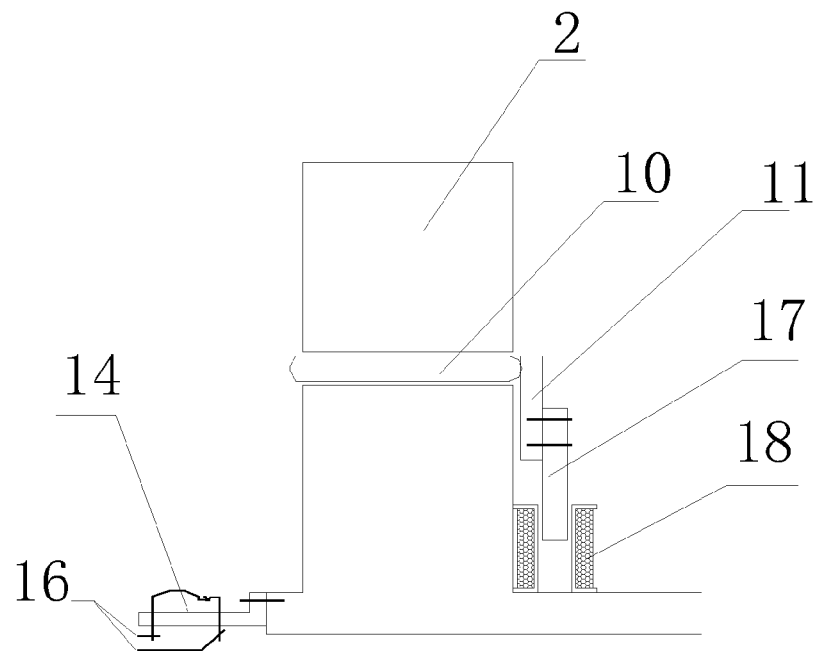
FIG. 16 is a partial enlarged drawing of the stiffness control mechanism in FIG. 14.
Figure 17:
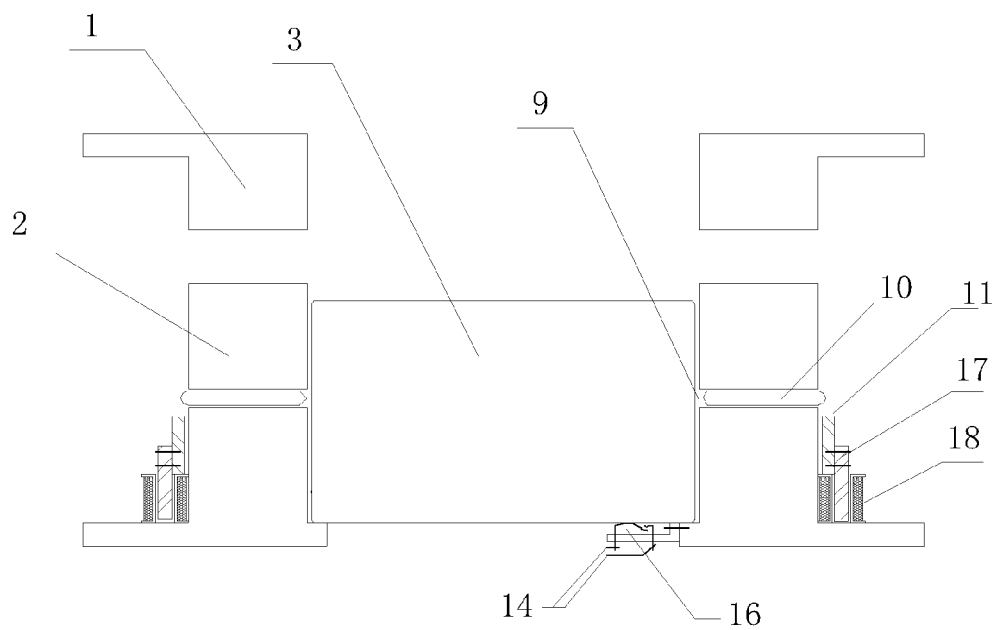
FIG. 17 is a schematic drawing of the stiffness control mechanism of the variable stiffness earthquake-isolation layer adapted to structural earthquake isolation and wind resistance of the present invention when the pin key is in the non-working state.

In FIG. 8, the pin key is in the working state, and the stiffness control mechanism 29 has very high stiffness, thus having strong wind resistance; in FIG. 9, the pin key is in the non-working state, and the stiffness control mechanism 29 has the stiffness close to zero, thus able to isolate the action of an earthquake effectively.

Example 2

As shown in FIGS. 14-17, Example 2 is the same as Example 1 except the following parts:

The control means comprises three lateral apertures 9 in the lower flange plate 2, three stop sliders 10 in the three apertures, a stop ring 11 provided on the inner side with a strip groove that is arranged at the exit of the three lateral apertures 9 on the outer side of the lower flange plate 2, three electromagnets 17 connected to the bottom of the stop ring 11, an electromagnet coil 18 wrapped around the lower portion of the electromagnet 17, a circuit connected to the electromagnet coil 18, and a ball 13 placed on a normally open switch 12 of the circuit; and the circuit is also connected in series with a normally closed switch 14 that is located just under the pin key 3.

Example 3

Figure 18:
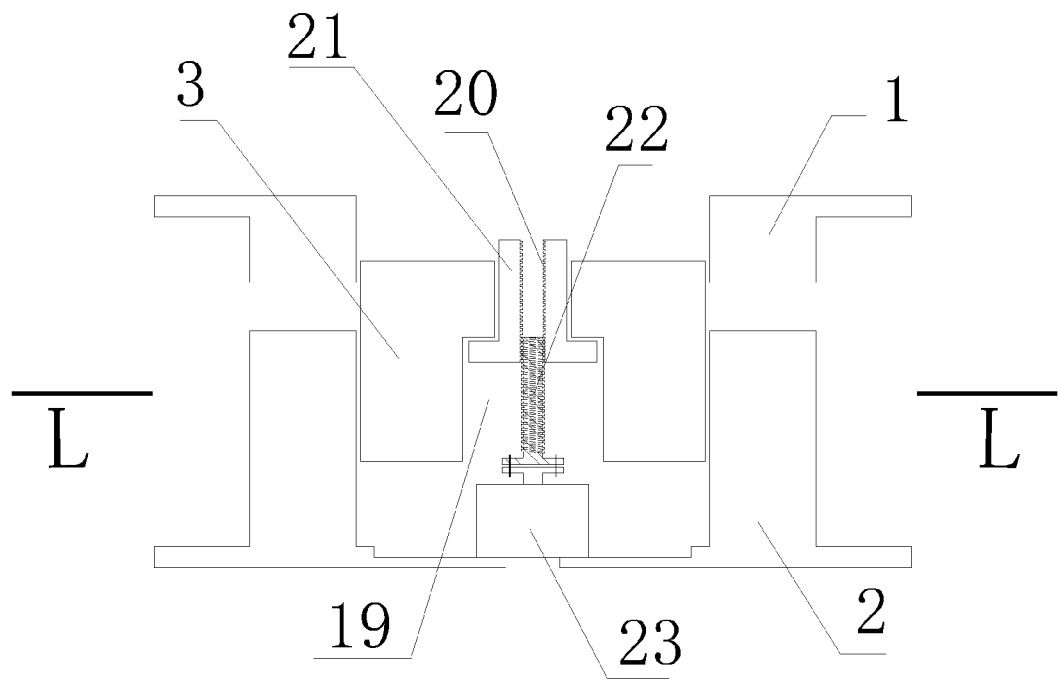
FIG. 18 is a schematic drawing of the stiffness control mechanism of the variable stiffness earthquake-isolation layer adapted to structural earthquake isolation and wind resistance of the present invention when the pin key is in the working state.
Figure 19:
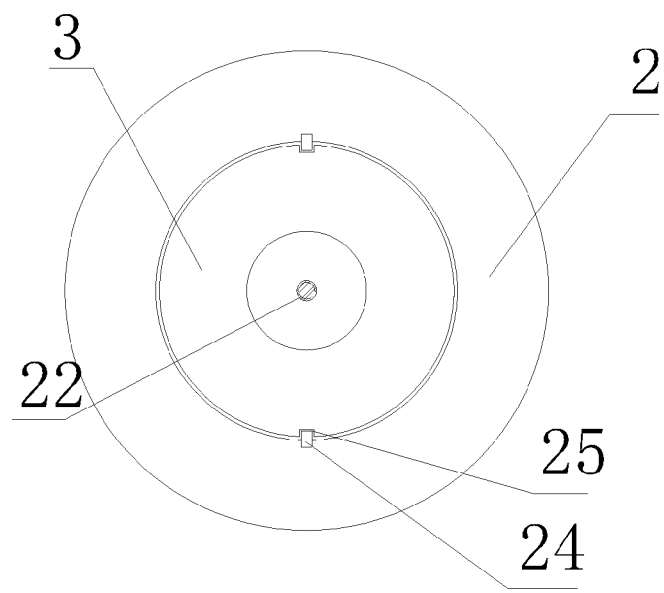
FIG. 19 is a schematic drawing of the L-L face of the stiffness control mechanism in FIG. 18.
Figure 20:
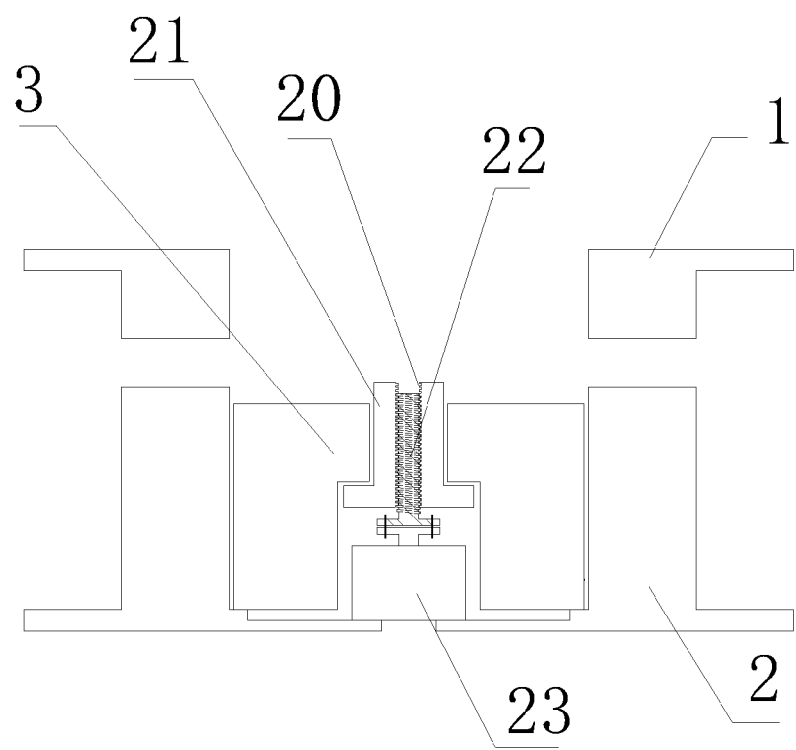
FIG. 20 is a schematic drawing of the stiffness control mechanism of the variable stiffness earthquake-isolation layer adapted to structural earthquake isolation and wind resistance of the present invention when the pin key is in the non-working state.

As shown in FIGS. 18-20, Example 3 is the same as Example 1 except the following parts:

The control device comprises an inner hole 19 disposed in the middle of the pin key, a pin-key supporting means 21 having thread 20 on the inner side and passing through the inner hole 19, a screw 22 adapted to the thread on the inner side, a stepping motor 23 connected to the screw 22, a computer controlling the stepping motor 23 to work, and an acceleration sensor connected to the computer, as well as a means for restricting free rotation of the pin key 3 relative to the lower flange plate 2;

the means for restricting free rotation of the pin key 3 relative to the lower flange plate comprises one or more longitudinal projections 24 provided on the inner side of the hollow portion of the upper and lower flange plates, the pin key is provided in the corresponding position with a groove 25 adapted to the size of the projection 24 or the cross section of the pin key 3 is directly set to have a non-circular shape, and the hollow portion accommodating the pin key 3 is set to have a non-circular shape adapted to the pin key 3, which are also possible to achieve the purpose of restricting free rotation of the pin key 3 relative to the lower flange plate; a means for restricting free rotation of the pin-key supporting means 21 in the inner hole 19 of the pin key 3, the same or not the same as the means for restricting free rotation of the pin key relative to the lower flange plate, is provided between the pin-key supporting means 21 and the pin key 3; and the stepping motor 23 is disposed just under the screw 22, and the pin key 3 is provided at the lower portion with a groove adapted to the size of the stepping motor 23, with this groove also being a part of the inner hole in the middle of the pin key.

The examples as described above are the preferred embodiments of the present invention. However, the embodiments of the present invention are not restricted to the above examples. Any other alterations, modifications, substitutions, combinations and simplifications, so long as not departing from the spirit and principle of the present invention, should be construed as equivalent permutations and included within the scope of the present invention.

What is claimed is:

1. A stiffness control mechanism of a variable stiffness earthquake-isolation layer adapted for structural earthquake isolation and wind resistance, the stiffness control mechanism comprising:
    an upper flange plate connected to an upper structure,
    a lower flange plate having a bottom and an outer side, wherein the lower flange plate is connected to a base structure at the bottom,
    a pin key provided between hollow portions of the upper and lower flange plates, with the pin key movable up and down between the hollow portions of the upper and lower flange plates, wherein the pin key has a middle and a height greater than a distance between the upper and lower flange plates, and
    a control device for fixing the pin key or controlling the pin key to move downward, wherein the control device is triggered by a ground acceleration caused by an earthquake, and wherein the control device comprises:
        an elastic holder provided in an interval between the upper and lower flange plates and used for gripping the pin key,
        a movable lug locking both ends of the elastic holder,
        a bearing rod fixed to the lower flange plate, the bearing rod having a height, a top end, and a bottom end,
        a steel ball placed on the bearing rod, the steel ball having a size, and
        a flexible cord connecting the steel ball and the movable lug and having a length, wherein a vertical distance separates the movable lug from the steel ball, and wherein the length of the flexible cord is greater than the vertical distance of the movable lug from the steel ball, and less than a sum of the vertical distance of the movable lug from the steel ball and the height of the bearing rod, and the elastic holder is fixedly connected with the lower flange plate.

2. The stiffness control mechanism according to claim 1, wherein the bearing rod is provided at the top end with a shallow groove adapted to the size of the steel ball.

3. The stiffness control mechanism according to claim 1, wherein the elastic holder, in the form of a symmetrical curve, has a function of fixing the pin key between the upper and lower flange plates when the elastic holder is locked by the movable lug; and wherein the elastic holder opens automatically when the movable lug is detached from the elastic holder, thus losing the function of fixing the pin key.

4. A stiffness control mechanism of a variable stiffness earthquake-isolation layer adapted for structural earthquake isolation and wind resistance, the stiffness control mechanism comprising:
    an upper flange plate connected to an upper structure,
    a lower flange plate having a bottom and an outer side, wherein the lower flange plate is connected to a base structure at the bottom,
    a pin key provided between hollow portions of the upper and lower flange plates, with the pin key movable up and down between the hollow portions of the upper and lower flange plates, wherein the pin key has a middle and a height greater than a distance between the upper and lower flange plates, and
    a control device for fixing the pin key or controlling the pin key to move downward, wherein the control device is triggered by a ground acceleration caused by an earthquake, and wherein the control device comprises:
        K lateral apertures in the lower flange plate, wherein each K lateral aperture has an exit,
        K stop sliders in the K apertures,
        a stop ring with a strip groove on an inner side that is arranged at the exit of the K lateral apertures on the outer side of the lower flange plate, wherein the stop ring has a bottom,
        M electromagnets connected to the bottom of the stop ring, wherein each electromagnet has a lower portion,
        an electromagnet coil wrapped around the lower portion of each electromagnet,
        a circuit connected to each electromagnet coil, and a ball placed on a normally open switch of the circuit, wherein the normally open switch closes when the ball is displaced, and wherein K≥2 and M≥K.

5. The stiffness control mechanism according to claim 4, wherein the circuit is also connected in series with a normally closed switch that is located under the pin key, wherein the normally closed switch opens when contacted by the pin key.

6. A stiffness control mechanism of a variable stiffness earthquake-isolation layer adapted for structural earthquake isolation and wind resistance, the stiffness control mechanism comprising:
   an upper flange plate connected to an upper structure,
   a lower flange plate having a bottom and an outer side, wherein the lower flange plate is connected to a base structure at the bottom,
   a pin key provided between hollow portions of the upper and lower flange plates, with the pin key movable up and down between the hollow portions of the upper and lower flange plates, wherein the pin key has a middle and a height greater than a distance between the upper and lower flange plates, and
   a control device for fixing the pin key or controlling the pin key to move downward, wherein the control device is triggered by a ground acceleration caused by an earthquake, and wherein the control device comprises:
   an inner hole disposed in the middle of the pin key, the inner hole having an inner side with a thread,
   a pin-key supporting means internally threaded and passing through the inner hole,
   a screw adapted to the thread on the inner side,
   a stepping motor connected to the screw,
   a computer controlling the stepping motor to work,
   an acceleration sensor connected to the computer, and
   a means for restricting free rotation of the pin key relative to the lower flange plate and a means for restricting free rotation of the pin-key supporting means in the inner hole.

7. The stiffness control mechanism according to claim 6, wherein the stepping motor is disposed under the screw, and the pin key is provided at the lower portion with a groove adapted to receive the stepping motor therein.

* * * * *

UNITED STATES PATENT AND TRADEMARK OFFICE
CERTIFICATE OF CORRECTION

PATENT NO. : 9,915,079 B2
APPLICATION NO. : 15/306412
DATED : March 13, 2018
INVENTOR(S) : Xuanwu Shu It is certified that error appears in the above-identified patent and that said Letters Patent is hereby corrected as shown below:

On the Title Page

Item (71):
Now reads: "Applicant: Architectural Design & Research Institute of South China University of Technology, Guanzhou, Guangdong Province (CN)"
Should read: -- Applicant: Architectural Design & Research Institute of South China University of Technology Co., Ltd., Guanzhou, Guangdong Province (CN) --

Signed and Sealed this
Eighth Day of October, 2019

Andrei Iancu
*Director of the United States Patent and Trademark Office*